(12) United States Patent
Zhong et al.

(10) Patent No.: US 10,049,426 B2
(45) Date of Patent: Aug. 14, 2018

(54) DRAW CALL VISIBILITY STREAM

(71) Applicant: QUALCOMM Incorporated, San Diego, CA (US)

(72) Inventors: Gang Zhong, San Diego, CA (US); Feng Ge, San Diego, CA (US); Li Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 15/397,307

(22) Filed: Jan. 3, 2017

(65) Prior Publication Data

US 2018/0189923 A1 Jul. 5, 2018

(51) Int. Cl.
*G06T 15/40* (2011.01)
*G06T 1/20* (2006.01)
*G06T 1/60* (2006.01)

(52) U.S. Cl.
CPC .................. *G06T 1/20* (2013.01); *G06T 1/60* (2013.01); *G06T 15/40* (2013.01); *G06T 15/405* (2013.01)

(58) Field of Classification Search
CPC . G06T 15/40–15/405; G06T 1/60; G06T 1/20
See application file for complete search history.

(56) References Cited

U.S. PATENT DOCUMENTS

| 5,579,455 | A | 11/1996 | Greene et al. |
| 6,359,623 | B1 | 3/2002 | Larson |
| 6,480,205 | B1 | 11/2002 | Greene et al. |
| 2005/0195187 | A1 | 9/2005 | Seiler et al. |
| 2011/0285740 | A1 | 11/2011 | Kilgard |

*Primary Examiner* — Robert Craddock
(74) *Attorney, Agent, or Firm* — Shumaker & Sieffert, P.A.

(57) ABSTRACT

This disclosure describes a device configured to generate a primitive visibility stream that indicates whether respective primitives of a set of primitives are visible when rendered and to generate, based on the primitive visibility stream, a draw call visibility stream that indicates whether respective draw calls for rendering the set of primitives include instructions for rendering visible primitives of the set of primitives. Based on the draw call visibility stream indicating that a respective draw call does not include instructions for rendering visible primitives, the device is further configured to drop the respective draw call. Based on the draw call visibility stream indicating that the respective draw call includes instructions for rendering visible primitives, the device is further configured to execute the respective draw call.

27 Claims, 6 Drawing Sheets

DRAW CALL VISIBILITY STREAM

TECHNICAL FIELD

This disclosure relates to graphics processing.

BACKGROUND

A device that provides content for visual presentation on an electronic display generally includes a graphics processing unit (GPU). The GPU renders pixels that are representative of the content on a display. The GPU generates one or more pixel values for each pixel on the display and performs graphics processing on the pixel values for each pixel on the display to render each pixel for presentation.

SUMMARY

The techniques of this disclosure generally relate to rendering graphics data. For example, the techniques of this disclosure include techniques for reducing processing of graphical content that is not visible in a final rendered image. For example, a graphics processing unit (GPU) may use the techniques of this disclosure to prevent draw calls that do not modify any visible primitives from being executed (such draw calls may be referred to herein as "dropped"). In this way, the techniques may, in some instances, improve the functionality of the GPU by increasing the efficiency with which the GPU operates.

In one or more examples of this disclosure, a method includes generating a primitive visibility stream that indicates whether respective primitives of a set of primitives are visible when rendered and generating, based on the primitive visibility stream, a draw call visibility stream that indicates whether respective draw calls for rendering the set of primitives include instructions for rendering visible primitives of the set of primitives. Based on the draw call visibility stream indicating that a respective draw call does not include instructions for rendering visible primitives, the method further includes dropping the respective draw call. Based on the draw call visibility stream indicating that the respective draw call includes instructions for rendering visible primitives, executing the respective draw call, the method further includes executing the respective draw call.

In some examples of the disclosure, a device configured to generate a primitive visibility stream that indicates whether respective primitives of a set of primitives are visible when rendered and to generate, based on the primitive visibility stream, a draw call visibility stream that indicates whether respective draw calls for rendering the set of primitives include instructions for rendering visible primitives of the set of primitives. Based on the draw call visibility stream indicating that a respective draw call does not include instructions for rendering visible primitives, the device is further configured to drop the respective draw call. Based on the draw call visibility stream indicating that the respective draw call includes instructions for rendering visible primitives, the device is further configured to execute the respective draw call.

In some examples of the disclosure, a non-transitory computer-readable medium having instructions stored thereon that, when executed, cause one or more processors to generate a primitive visibility stream that indicates whether respective primitives of a set of primitives are visible when rendered and to generate, based on the primitive visibility stream, a draw call visibility stream that indicates whether respective draw calls for rendering the set of primitives include instructions for rendering visible primitives of the set of primitives. Based on the draw call visibility stream indicating that a respective draw call does not include instructions for rendering visible primitives, the one or more processors are further caused to drop the respective draw call. Based on the draw call visibility stream indicating that the respective draw call includes instructions for rendering visible primitives, the one or more processors are further caused to execute the respective draw call.

In some examples of the disclosure, a device includes means for generating a primitive visibility stream that indicates whether respective primitives of a set of primitives are visible when rendered and means for generating, based on the primitive visibility stream, a draw call visibility stream that indicates whether respective draw calls for rendering the set of primitives include instructions for rendering visible primitives of the set of primitives. The device further includes means for dropping the respective draw call based on the draw call visibility stream indicating that a respective draw call does not include instructions for rendering visible primitives and means for executing the respective draw call based on the draw call visibility stream indicating that the respective draw call includes instructions for rendering visible primitives.

The details of one or more examples of the disclosure are set forth in the accompanying drawings and the description below. Other features, objects, and advantages of the disclosure will be apparent from the description and drawings, and from the claims.

DETAILED DESCRIPTION

Graphics processing unit (GPU) architectures may require a relatively large amount of data to be read from and written to system memory when rendering a frame of graphics data. Accordingly, tile-based architectures have been developed that break an image into multiple tiles. When performing tile-based rendering a GPU may perform a binning pass and a rendering pass. With respect to the binning pass, the GPU may process an entire image and sort rasterized primitives (such as triangles) into tile-sized areas that may be referred to as bins. For example, the GPU processes a command stream for an entire image and assigns the rasterized primitives of the image to bins.

In addition to sorting primitives to bins, the GPU may generate a visibility stream that indicates the primitives that are visible in the final image and the primitives that are invisible in the final image. For example, the GPU signals a '1' in a position of the visibility stream corresponding to a primitive when the primitive is visible and signals a '0' in the position of the visibility stream corresponding to the primitive when the primitive is invisible. A primitive may be invisible if it is obstructed or is outside of a viewing area such that the primitive cannot be seen in the shaded, finished image.

However, during the rendering pass, a command processor may use a significant amount of computational effort to decode the visibility stream to determine whether any primitives of a draw call for a bin being rendered are visible. For example, the command processor may need to scan the visibility stream for every primitive indicated in the draw call to determine whether the draw call includes any visible primitives. In some instances, a draw call may not include any visible primitives. Accordingly, the command processor may inefficiently use computational resources when processing the visibility stream for draw calls that have no visible primitives.

According to aspects of this disclosure, one or more techniques described herein permit the GPU to generate and use a draw call visibility stream to reduce the amount of computational effort to determine whether any primitives in a bin being rendered for a draw call are visible. In this way, rather than the command processor decoding and scanning an entire visibility stream for every primitive of a bin, according to aspects of this disclosure, the command processor may initially decode the draw call visibility stream. Based on the draw call visibility stream, the command processor may refrain from executing an entire draw call containing multiple invisible primitives and no visible primitives. By refraining from executing the draw call, the GPU may skip the decoding of the portion of the visibility stream that corresponds to the draw call.

Figure 1:
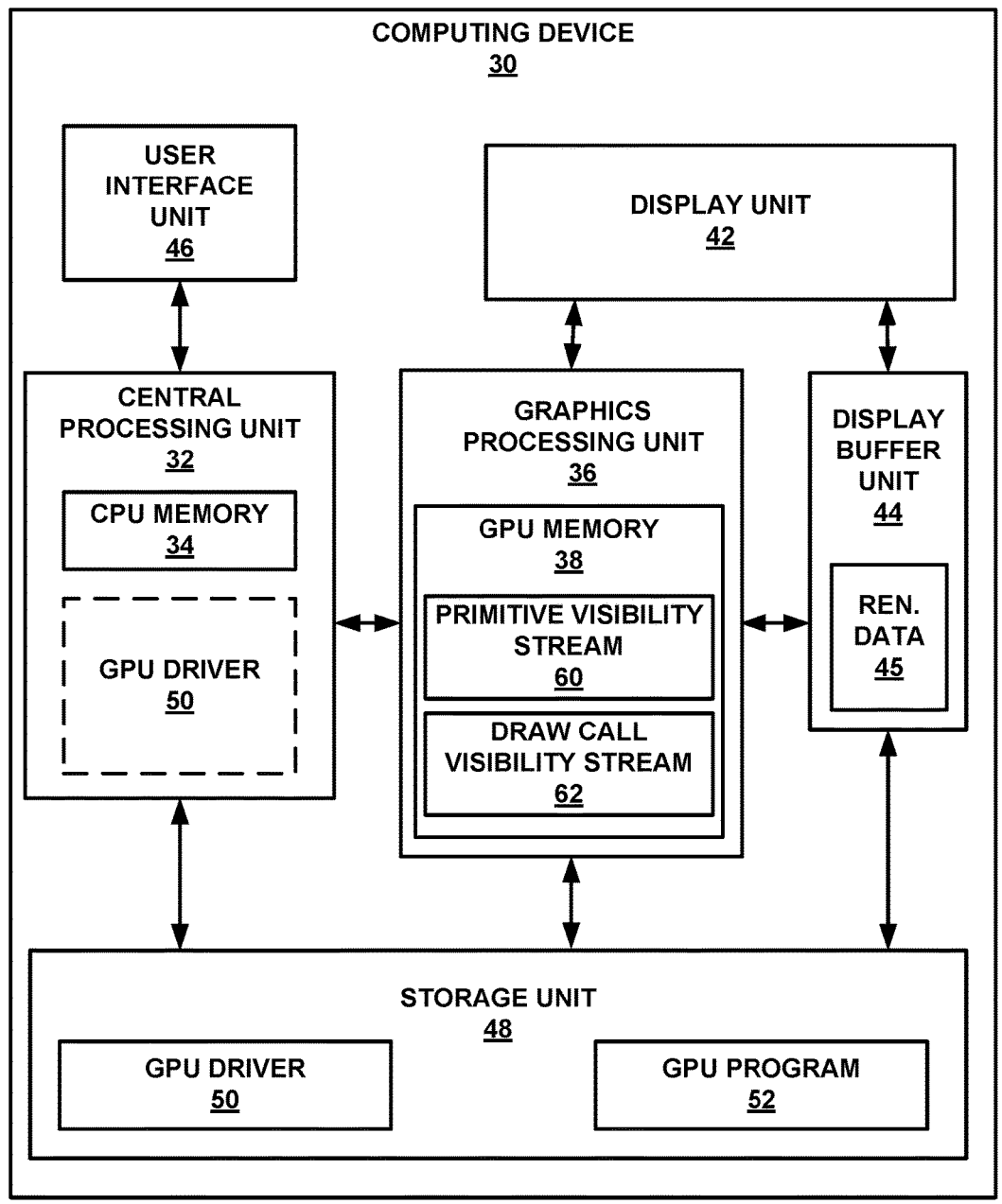
FIG. 1 is a block diagram showing an example computing device configured to use the techniques of this disclosure.

FIG. 1 is a block diagram illustrating a computing device 30 that may implement the techniques of this disclosure for rendering graphics data. Examples of computing device 30 include, but are not limited to, wireless devices, mobile or cellular telephones, including so-called smartphones, personal digital assistants (PDAs), video gaming consoles that include video displays, mobile video gaming devices, mobile video conferencing units, laptop computers, desktop computers, television set-top boxes, tablet computing devices, e-book readers, fixed or mobile media players, and the like.

In the example of FIG. 1, computing device 30 includes a central processing unit (CPU) 32 having CPU memory 34, a graphics processing unit (GPU) 36 having GPU memory 38, a display unit 42, a display buffer unit 44 storing rendered data 45 ("ren. data"), a user interface unit 46, and a data storage unit 48. In addition, storage unit 48 may store GPU driver 50 and GPU program 52. As shown, GPU memory 38 may store primitive visibility stream 60 and draw call visibility stream 62.

Examples of CPU 32 include, but are not limited to, a digital signal processor (DSP), general purpose microprocessor, application specific integrated circuit (ASIC), field programmable logic array (FPGA), or other equivalent integrated or discrete logic circuitry. Although CPU 32 and GPU 36 are illustrated as separate units in the example of FIG. 1, in some examples, CPU 32 and GPU 36 may be integrated into a single unit. CPU 32 may execute one or more applications. Examples of the applications may include web browsers, e-mail applications, spreadsheets, video games, audio and/or video capture, playback or editing applications, or other applications that initiate the generation for image data to be presented via display unit 42.

The software applications that execute on CPU 32 may include one or more graphics rendering instructions that instruct CPU 32 to cause the rendering of graphics data to display unit 42. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 32 may issue one or more graphics rendering commands to CPU 36 (e.g., through GPU driver 50) to cause GPU 36 to perform some or all of the rendering of the graphics data. In some examples, the graphics data to be rendered may include a list of graphics primitives, e.g., points, lines, triangles, quadrilaterals, triangle strips, etc.

In the example shown in FIG. 1, CPU 32 includes CPU memory 34. CPU memory 34 may represent on-chip storage or memory used in executing machine or object code. CPU memory 34 may each comprise a hardware memory register capable of storing a fixed number of digital bits. CPU 32 may be able to read values from or write values to local CPU memory 34 more quickly than reading values from or writing values to storage unit 48, which may be accessed, e.g., over a system bus.

GPU 36 represents one or more dedicated processors for performing graphical operations. That is, for example, GPU 36 may be a dedicated hardware unit having fixed function and programmable components for rendering graphics and executing GPU applications. GPU 36 may also include a DSP, a general purpose microprocessor, an ASIC, an FPGA, or other equivalent integrated or discrete logic circuitry.

GPU 36 also includes GPU memory 38, which may represent on-chip storage or memory used in executing machine or object code. GPU memory 38 may each comprise a hardware memory register capable of storing a fixed number of digital bits. GPU 36 may be able to read values from or write values to local GPU memory 38 more quickly than reading values from or writing values to storage unit 48, which may be accessed, e.g., over a system bus.

Display unit 42 represents a unit capable of displaying video data, images, text or any other type of data for consumption by a viewer. Display unit 42 may include a liquid-crystal display (LCD) a light emitting diode (LED) display, an organic LED (OLED), an active-matrix OLED (AMOLED) display, or the like.

Display buffer unit 44 represents a memory or storage device dedicated to storing data for presentation of imagery, such as computer generated graphics, still images, video frames, or the like (rendered data 45) for display unit 42. Display buffer unit 44 may represent a two-dimensional buffer that includes a plurality of storage locations. The number of storage locations within display buffer unit 44 may be substantially similar to the number of pixels to be displayed on display unit 42. For example, if display unit 42 is configured to include 640×480 pixels, display buffer unit 44 may include 640×480 storage locations storing pixel color and intensity information, such as red, green and blue pixel values, or other color values.

Display buffer unit 44 may store the final pixel values for each of the pixels processed by GPU 36. Display unit 42 may retrieve the final pixel values from display buffer unit 44, and display the final image based on the pixel values stored in display buffer unit 44.

User interface unit 46 represents a unit with which a user may interact with or otherwise interface to communicate with other units of computing device 30, such as CPU 32. Examples of user interface unit 46 include, but are not limited to, a trackball, a mouse, a keyboard, and other types of input devices. User interface unit 46 may also be, or include, a touch screen and the touch screen may be incorporated as a part of display unit 42.

Storage unit 48 may comprise one or more computer-readable storage media. Examples of storage unit 48 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer or a processor.

In some example implementations, storage unit 48 may include instructions that cause CPU 32 and/or GPU 36 to perform the functions ascribed to CPU 32 and GPU 36 in this disclosure. Storage unit 48 may, in some examples, be considered as a non-transitory storage medium. The term "non-transitory" may indicate that the storage medium is not embodied in a carrier wave or a propagated signal. However, the term "non-transitory" should not be interpreted to mean that storage unit 48 is non-movable. As one example, storage unit 48 may be removed from computing device 30, and moved to another device. As another example, a storage unit, substantially similar to storage unit 48, may be inserted into computing device 30. In certain examples, a non-transitory storage medium may store data that can, over time, change (e.g., in RAM).

Storage unit 48 stores a GPU driver 50 and GPU program 52. GPU driver 50 represents a computer program or executable code that provides an interface to access GPU 36. CPU 32 executes GPU driver 50 or portions thereof to interface with GPU 36 and, for this reason, GPU driver 50 is shown in the example of FIG. 1 as a dash-lined box labeled "GPU driver 50" within CPU 32. GPU driver 50 is accessible to programs or other executables executed by CPU 32, including GPU program 52.

GPU program 52 may include code written in a high level (HL) programming language, e.g., using an application programming interface (API). Examples of APIs include Open-Computing Language ("OpenCL"), Open Graphics Library ("OpenGL"), and DirectX, as developed by Microsoft, Inc. In general, an API includes a predetermined, standardized set of commands that are executed by associated hardware. API commands allow a user to instruct hardware components of a GPU to execute commands without user knowledge as to the specifics of the hardware components.

GPU program 52 may invoke or otherwise include one or more functions provided by GPU driver 50. CPU 32 generally executes the program in which GPU program 52 is embedded and, upon encountering GPU program 52, passes GPU program 52 to GPU driver 50. CPU 32 executes GPU driver 50 in this context to process GPU program 52. That is, for example, GPU driver 50 may process GPU program 52 by compiling GPU program 52 into object or machine code executable by GPU 36.

GPU 36 may generate a number of primitives to be displayed at display unit 42. Primitives may include one or more of a line (including curves, splines, etc.), a point, a circle, an ellipse, a polygon (where typically a polygon is defined as a collection of one or more primitives) or any other two-dimensional (2D) primitive. The term "primitive" may also refer to three-dimensional (3D) primitives, such as cubes, cylinders, sphere, cone, pyramid, torus, or the like. Generally, the term "primitive" refers to any basic geometric shape or element capable of being rendered by GPU 36 for display as an image (or frame in the context of video data) via display unit 42.

GPU 36 may transform primitives and other attributes (e.g., that defines a color, texture, lighting, camera configuration, or other aspect) of the primitives into a so-called "world space" by applying one or more model transforms (which may also be specified in the state data). Once transformed, GPU 36 may apply a view transform for the active camera (which again may also be specified in the state data defining the camera) to transform the coordinates of the primitives and lights into the camera or eye space. GPU 36 may also perform vertex shading to render the appearance of the primitives in view of any active lights. GPU 36 may perform vertex shading in one or more of the above model, world or view space (although it is commonly performed in the world space).

Once the primitives are shaded, GPU 36 may perform projections to project the image into a unit cube with extreme points, as one example, at (−1, −1, −1) and (1, 1, 1). This unit cube is commonly referred to as a canonical view volume. After transforming the model from the eye space to the canonical view volume, GPU 36 may perform clipping to remove any primitives that do not at least partially reside within the view volume. In other words, GPU 36 may remove any primitives that are not within the frame of the camera. GPU 36 may then map the coordinates of the primitives from the view volume to the screen space, effectively reducing the 3D coordinates of the primitives to the 2D coordinates of the screen.

Given the transformed and projected vertices defining the primitives with their associated shading data, GPU 36 may then rasterize the primitives. During rasterization, GPU 36 may apply any textures associated with the primitives (where textures may comprise state data). GPU 36 may also perform a Z-buffer algorithm, also referred to as a depth test, during rasterization to determine whether any of the primitives and/or objects are occluded by any other objects. The Z-buffer algorithm sorts primitives according to their depth so that GPU 36 knows the order in which to draw each primitive to the screen. When binning (e.g., for tile-based rendering), shading may not be performed during rasterization. When rendering the primitives, however, GPU 36 may compute and set colors for the pixels of the screen covered by the primitives. GPU 36 then outputs rendered pixels to display buffer unit 44.

Display buffer unit 44 may temporarily store the rendered pixels of the rendered image until the entire image is rendered. Display buffer unit 44 may be considered as an image frame buffer in this context. Display buffer unit 44 may transmit the rendered image to be displayed on display unit 42. While shown and described separately, in some instances, display buffer unit 44 may form a portion of storage unit 48.

In some examples, GPU 36 may implement tile-based rendering to render an image. For example, GPU 36 may implement a tile-based architectures that renders an image by breaking the image into multiple portions, referred to as tiles. The tiles may be sized based on the size of GPU memory 38. For example, GPU 36 may render a tile to GPU memory 38. Upon completion of the tile, GPU 36 may transfer the tile from GPU memory 38 to storage unit 48 and/or display buffer unit 44 (as rendered data 45). After GPU 36 has rendered all of the tiles associated with a frame in this way, display buffer unit 44 may output the finished image to display unit 42. Rendering images using multiple tiles may reduce the amount and/or frequency of data transfer between GPU memory 38 and storage unit 48.

When performing tile-based rendering, GPU driver 50 may initially determine a binning configuration for rendering an image. For example, GPU driver 50 may determine a bin size based on the size of GPU memory 38. In addition, GPU driver 50 may apply a predetermined bin layout. For example, GPU driver 50 may set an initial bin in the upper left corner of an image. GPU driver 50 may add bins from left to right and top to bottom of the image until the entire image has been divided into bins.

GPU driver 50 also generates a command stream using GPU program 52. For example, the command stream may contain instructions for rendering images from GPU program 52. GPU driver 50 may add instructions to the command stream, which are executed by GPU 36 in the order in which they appear in the stream. The command stream may define the primitives that make up images from GPU program 52.

After the initial binning configuration and command stream has been set by GPU driver 50, GPU 36 may perform a binning pass and a rendering pass. With respect to the binning pass, GPU 36 may process an entire image and sort rasterized primitives into the bins of the initial binning configuration (set by GPU driver 50).

According to aspects of this disclosure, GPU 36 may generate a primitive visibility stream 60, draw call visibility stream 62, or other information during the binning pass to indicate visible primitives, which may be separated according to bin. For example, GPU 36 may generate primitive visibility stream 60 that includes a series of 1's and 0's, with each "1" indicating that associated pixels are visible in the final image and each "0" indicating that associated pixels are invisible (e.g., occluded by one or more other pixels) in the final image.

GPU 36 also generates draw call visibility stream 62. Draw call visibility stream 62 may indicate draw calls having visible primitives. For example, draw call visibility stream 62 may indicate, for each draw call of a set of draw calls used to render the primitives for a particular bin, whether any of the primitives rendered during execution of the draw call are visible in the final image. For example, GPU 36 may generate draw call visibility stream 62 that includes a series of 1's and 0's, with each "1" indicating that associated the associated draw call includes at least one primitive that is visible in the final image and each "0" indicating that the associated draw call does not include any primitives that are visible in the final image (e.g., all primitives included in the draw call are occluded by one or more other pixels/primitives). In some instances, a particular draw call may include instructions for rendering only invisible primitives in the final image (e.g., all pixels of the primitives are occluded by other primitives/pixels). In such instances, as described herein, GPU 36 may use draw call visibility stream 62 to refrain from executing the draw call and the associated processing for the portion of primitive visibility stream 60 that corresponds to the draw call.

In some examples, draw call visibility stream 62 may include pointers that correspond to primitive visibility stream 60, e.g., to indicate where primitives for a draw call may be found in primitive visibility stream 60. In some examples, GPU 36 may generate draw call visibility stream 62 to indicate a number of consecutive draw calls of a command stream that do not indicate visible primitives of the primitive visibility stream 60. In other examples, GPU 36 may generate a per-bin list of indices (e.g., pointers to vertices) that represent only the primitives that are present in a given bin. As described herein, visibility information may generally refer to information such as visibility streams or other information that indicates which primitives and associated pixels are visible in a particular bin.

With respect to the rendering pass, GPU 36 may perform a clear/unresolve stage, a rendering stage, and a resolve stage. During the clear/unresolve stage, GPU 36 initializes GPU memory 38 for a new tile to be rendered. During the rendering stage, GPU 36 may render the tile and store the rendered tile to GPU memory 38. That is, GPU 36 may perform pixel shading and other operations to determine pixel values for each pixel of the tile and write the pixel values to CPU memory 38. During the resolve stage, GPU 36 may transfer the finished pixel values of the tile from GPU memory 38 to display buffer unit 44 (or storage unit 48).

Moreover, it should be understood that computing device 30 may include additional modules or units not shown in FIG. 1 for purposes of clarity. For example, computing device 30 may include a transceiver unit for transmitting and receiving data, and may include circuitry to allow wireless or wired communication between computing device 30 and another device or a network. Computing device 30 may also include a speaker and a microphone, neither of which are shown in FIG. 1, to effectuate telephonic communications in examples where computing device 30 is a mobile wireless telephone, such as a smartphone, or a speaker and/or a microphone where computing device 30 is a media player or tablet computer. In some instances, user interface unit 46 and display unit 42 may be external to computing device 30 in examples where computing device 30 is a desktop computer or other device that is equipped to interface with an external user interface or display.

Figure 2:
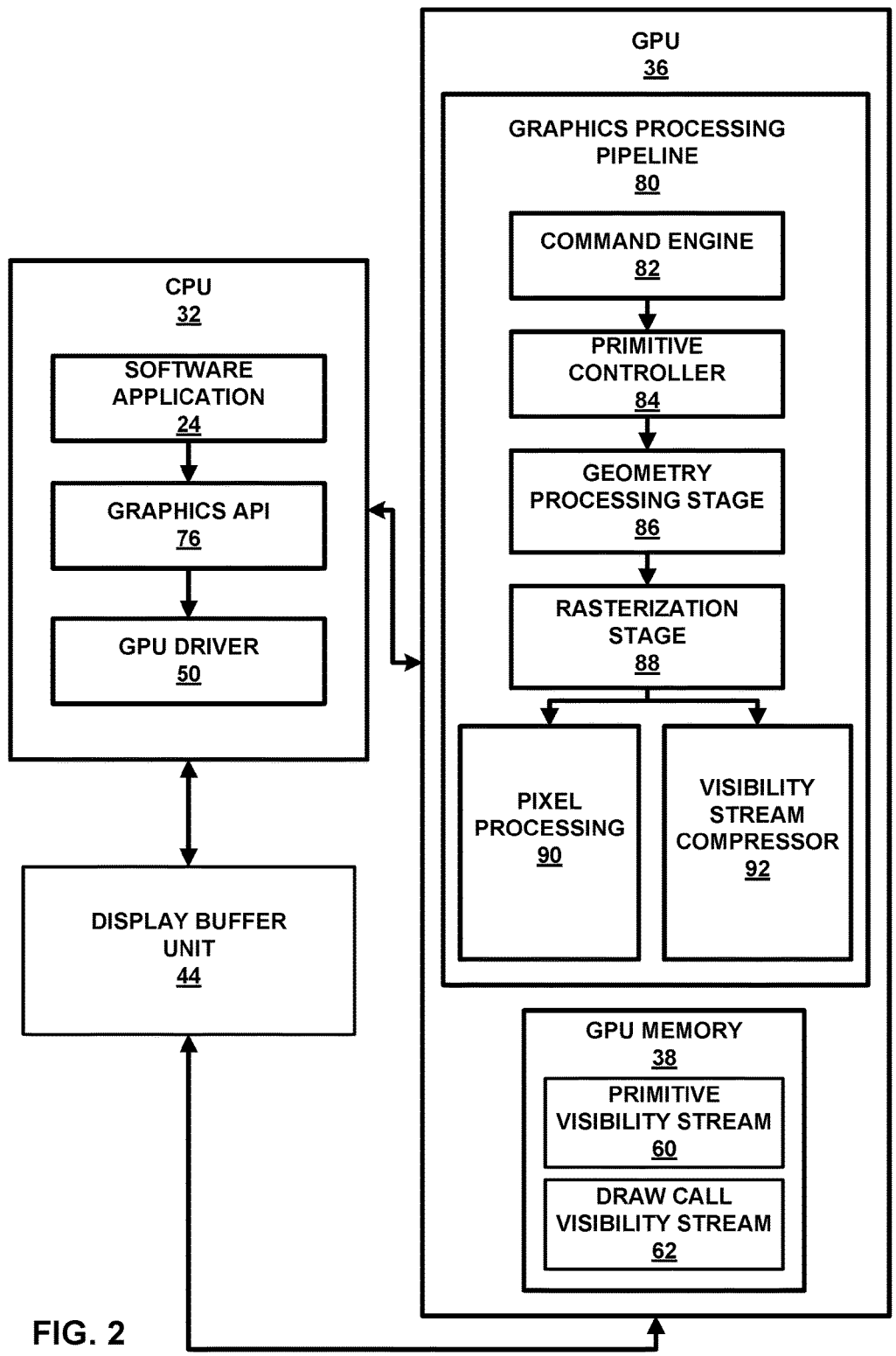
FIG. 2 is a block diagram showing components of FIG. 1 in more detail.

FIG. 2 is a block diagram illustrating example implementations of CPU 32, GPU 36, and display buffer unit 44 of FIG. 1 in further detail. CPU 32 may include at least one software application 24, graphics API 76, and GPU driver 50, each of which may be one or more software applications or services that execute on CPU 32. GPU 36 may include graphics processing pipeline 80 that includes a plurality of graphics processing stages that operate together to execute graphics processing commands. GPU 36 may be configured to execute graphics processing pipeline 80 in a variety of rendering modes, including a binning rendering mode and a direct rendering mode.

As shown in FIG. 2, graphics processing pipeline 80 may include command engine 82, primitive controller 84, geometry processing stage 86, rasterization stage 88, pixel processing 90, and visibility stream compressor 92. Each of the components in graphics processing pipeline 80 may be implemented as fixed-function components, programmable components (e.g., as part of a shader program executing on a programmable shader unit), or as a combination of fixed-function and programmable components. Although not shown, memory available to CPU 32 and GPU 36 may include storage unit 48 of FIG. 1. Display buffer unit 44 may be a part of storage unit 48 or may be separate from storage unit 48. Display buffer unit 44 may store rendered image data.

Software application 24 may be any application that utilizes the functionality of GPU 36. For example, software application 24 may be a GUI application, an operating system, a portable mapping application, a computer-aided design program for engineering or artistic applications, a video game application, or another type of software application that may utilize a GPU.

Software application 24 may include one or more drawing instructions that instruct GPU 36 to render a graphical user interface (GUI) and/or a graphics scene. For example, the drawing instructions may include instructions that define a set of one or more graphics primitives to be rendered by GPU 36. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 50, via graphics API 76, to issue one or more commands to GPU 36 for rendering one or more graphics primitives into displayable graphics images. For example, software application 24 may invoke GPU driver 50, via graphics API 76, to provide primitive definitions to GPU 36. In some instances, the primitive definitions may be provided to GPU 36 in the form of a draw call that lists drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates.

The primitive definitions may also include primitive type information (e.g., triangle, rectangle, triangle fan, triangle strip, etc.), scaling information, rotation information, and the like. Based on the instructions issued by software application 24 to GPU driver 50, GPU driver 50 may formulate one or more commands that specify one or more operations for GPU 36 to perform in order to render the primitive. When GPU 36 receives a command from CPU 32, graphics processing pipeline 80 decodes the command and configures one or more processing elements within graphics processing pipeline 80 to perform the operation specified in the command. After performing the specified operations, graphics processing pipeline 80 outputs the rendered data to display buffer unit 44. Graphics processing pipeline 80 may be configured to execute in one of a plurality of different rendering modes, including a binning rendering mode and a direct rendering mode.

GPU driver 50 may be further configured to compile one or more shader programs, and to download the compiled shader programs onto one or more programmable shader units contained within GPU 36. The shader programs may be written in a high level shading language, such as, e.g., an OpenGL Shading Lnguage (GLSL), a High Level Shading Language (HLSL), a C for Graphics (Cg) shading language, etc. The compiled shader programs may include one or more instructions that control the operation of a programmable shader unit within GPU 36. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 80 may be configured to receive one or more graphics processing commands from CPU 32, via GPU driver 50, and to execute the graphics processing commands to generate displayable graphics images. As discussed above, graphics processing pipeline 80 includes a plurality of stages that operate together to execute graphics processing commands. It should be noted, however, that such stages need not necessarily be implemented in separate hardware blocks. For example, portions of geometry processing stage 86 and pixel processing 90 may be implemented as part of a unified shader unit. Again, graphics processing pipeline 80 may be configured to execute in one of a plurality of different rendering modes, including a binning rendering mode and a direct rendering mode.

Command engine 82 may receive graphics processing commands and configure the remaining processing stages within graphics processing pipeline 80 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene.

Command engine 82 receive a command stream that includes a set of draw calls. For instance, GPU driver 50 may output, to command engine 82, a set of draw calls for rendering an image. In some examples, the set of draw calls may indicate primitives that are not visible when rendered. For instance, one or more draw calls may indicate primitives that are not visible when rendered because the primitives are outside of a current bin being rendered. In some instances, one or more draw calls may indicate primitives that are not visible when rendered because the primitives are under (e.g., occluded by) an opaque primitive.

Command engine 82 may decode draw call visibility stream 62. For example, visibility stream compressor 92 may compress draw call visibility stream 62 to reduce an amount of data used for storing draw call visibility stream 62 in GPU memory 38. In the example, command engine 82 may decode (e.g., decompress) draw call visibility stream 62.

Command engine 82 may determine whether draw call visibility stream 62 indicates that a draw call does not include instructions for rendering visible primitives of the set of primitives. For example, responsive to determining that draw call visibility stream 62 indicates a pointer for the draw call, command engine 82 may determine that draw call visibility stream 62 indicates that the draw call includes instructions for rendering visible primitives of the set of primitives. In the example, however, responsive to determining that draw call visibility stream 62 indicates a quantity of consecutive invisible draw calls that includes the draw call, command engine 82 may determine that draw call visibility stream 62 indicates that the draw call does not include instructions for rendering visible primitives of the set of primitives.

Command engine 82 may drop so called "invisible draw calls," e.g., draw calls that include instructions for rendering only primitives that are not visible in the final image. For example, responsive to determining that draw call visibility stream 62 indicates that the draw call does not include instructions for rendering visible primitives of the set of primitives, command engine 82 may refrain from processing the portion of primitive visibility stream 60 that corresponds to the draw call. In the example, however, responsive to determining that draw call visibility stream 62 indicates that the draw call includes instructions for rendering visible primitives of the set of primitives, command engine 82 may cause primitive controller 84 to process primitive visibility stream 60 to determine a visible primitive indicated by the draw call.

Primitive controller 84 may use draw call visibility stream 62 and primitive visibility stream 60 to serially decode a draw call visibility stream and a primitive visibility stream to produce primitive spans. For example, primitive controller 84 may decode draw call visibility stream 62 and drop draw calls when draw call visibility stream 62 indicates that the draw call includes only invisible primitives. For instance, responsive to determining that draw call visibility stream 62 indicates that the draw call does not include instructions for rendering visible primitives, primitive controller 84 may refrain from decoding primitive visibility stream 60. In some examples, primitive controller 84 may decode primitive visibility stream 60 when draw call visibility stream 62 indicates that the draw call includes instructions for rendering visible primitives. Primitive controller 84 may cause geometry processing stage 86 to perform geometry processing with respect to vertices and/or primitives associated with one or more received commands.

Geometry processing stage 86 may perform per-vertex operations and/or primitive setup operations on one or more vertices in order to generate primitive data for rasterization stage 88. Each vertex may be associated with a set of attributes, such as, e.g., positional coordinates, color values, a normal vector, and texture coordinates. Geometry processing stage 86 modifies one or more of these attributes according to various per-vertex operations. For example, geometry processing stage 86 may perform one or more transformations on vertex positional coordinates to produce modified vertex positional coordinates. Geometry processing stage 86 may, for example, apply one or more of a modeling transformation, a viewing transformation, a projection transformation, a Model View transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 86 may also perform per-vertex lighting operations on the vertices to generate modified color coordinates for the vertices. Geometry processing stage 86 may also perform other operations including, e.g., normal transformations, normal normalization operations, view volume clipping, homogenous division and/or backface culling operations.

Geometry processing stage 86 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 80. Conceptually, each vertex may correspond to a corner of a primitive where two edges of the primitive meet. Geometry processing stage 86 may provide the primitive data to rasterization stage 88 for further processing.

In some examples, all or part of geometry processing stage 86 may be implemented by one or more shader programs executing on one or more shader units. For example, geometry processing stage 86 may be implemented, in such examples, by a vertex shader, a geometry shader or any combination thereof. In other examples, geometry processing stage 86 may be implemented as a fixed-function hardware processing pipeline or as a combination of fixed-function hardware and one or more shader programs executing on one or more shader units.

Rasterization stage 88 is configured to receive, from geometry processing stage 86, primitive data that represents a primitive to be rasterized, and to rasterize the primitive to generate a plurality of source pixels that correspond to the rasterized primitive. In some examples, rasterization stage 88 may determine which screen pixel locations are covered by the primitive to be rasterized, and generate a source pixel for each screen pixel location determined to be covered by the primitive. Rasterization stage 88 may determine which screen pixel locations are covered by a primitive by using techniques known to those of skill in the art, such as, e.g., an edge-walking technique, evaluating edge equations, etc. Rasterization stage 88 may provide the resulting source pixels to pixel processing 90 for further processing.

The source pixels generated by rasterization stage 88 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 88 to be covered by a primitive may conceptually include pixels that represent the vertices of the primitive, pixels that represent the edges of the primitive and pixels that represent the interior of the primitive.

Pixel processing 90 is configured to receive a source pixel associated with a rasterized primitive, and to perform one or more per-pixel operations on the source pixel. Per-pixel operations that may be performed by pixel processing 90 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing 90 may execute one or more pixel shader programs to perform one or more per-pixel operations. The resulting data produced by pixel processing 90 may be referred to herein as destination pixel data and stored in display buffer unit 44. The destination pixel data may be associated with a destination pixel in display buffer unit 44 that has the same display location as the source pixel that was processed. The destination pixel data may include data such as, e.g., color values, destination alpha values, depth values, etc.

Display buffer unit 44 stores destination pixels for GPU 36. Each destination pixel may be associated with a unique screen pixel location. In some examples, display buffer unit 44 may store color components and a destination alpha value for each destination pixel. For example, display buffer unit 44 may store Red, Green, Blue, Alpha (RGBA) components for each pixel where the "RGB" components correspond to color values and the "A" component corresponds to a destination alpha value.

Visibility stream compressor 92 may generate primitive visibility stream 60 using source pixels associated with a rasterized primitives. For example, visibility stream compressor 92 may determine, based on a source pixels associated with a rasterized primitives output by rasterization stage 88, one or more obstructed primitives of the set of primitives that are obstructed by another primitive and indicate, in primitive visibility stream 60 that the one or more obstructed primitives are not visible. Additionally, or alternatively, visibility stream compressor 92 may determine, based on a source pixels associated with a rasterized primitives output by rasterization stage 88, one or more remote primitives that are outside of a region (e.g., bin) being processed by graphics processing pipeline 80 and indicate, in primitive visibility stream 60 that the one or more remote primitives are not visible.

Visibility stream compressor 92 may generate draw call visibility stream 62 based on primitive visibility stream 60. For example, visibility stream compressor 92 may determine, based on primitive visibility stream 60, that each primitive associated with a draw call is not visible and indicate, in draw call visibility stream 62 that the draw call is not visible. For instance, in response to determining that a draw call of the set of draw calls includes instructions for rendering at least one primitive of the set of primitives that is visible when rendered, visibility stream compressor 92 may generate, at an entry of draw call visibility stream 62 that corresponds to the draw call, a pointer indicating a portion of primitive visibility stream 60. In some instances, in response to determining that a draw call of the set of draw calls does not include instructions for rendering visible primitives of the set of primitives, visibility stream compressor 92 may generate, at an entry of draw call visibility stream 62 that corresponds to the draw call, an indication of a number of consecutive draw calls of the set of draw calls that do not include instructions for rendering visible primitives of the set of primitives.

Figure 3:
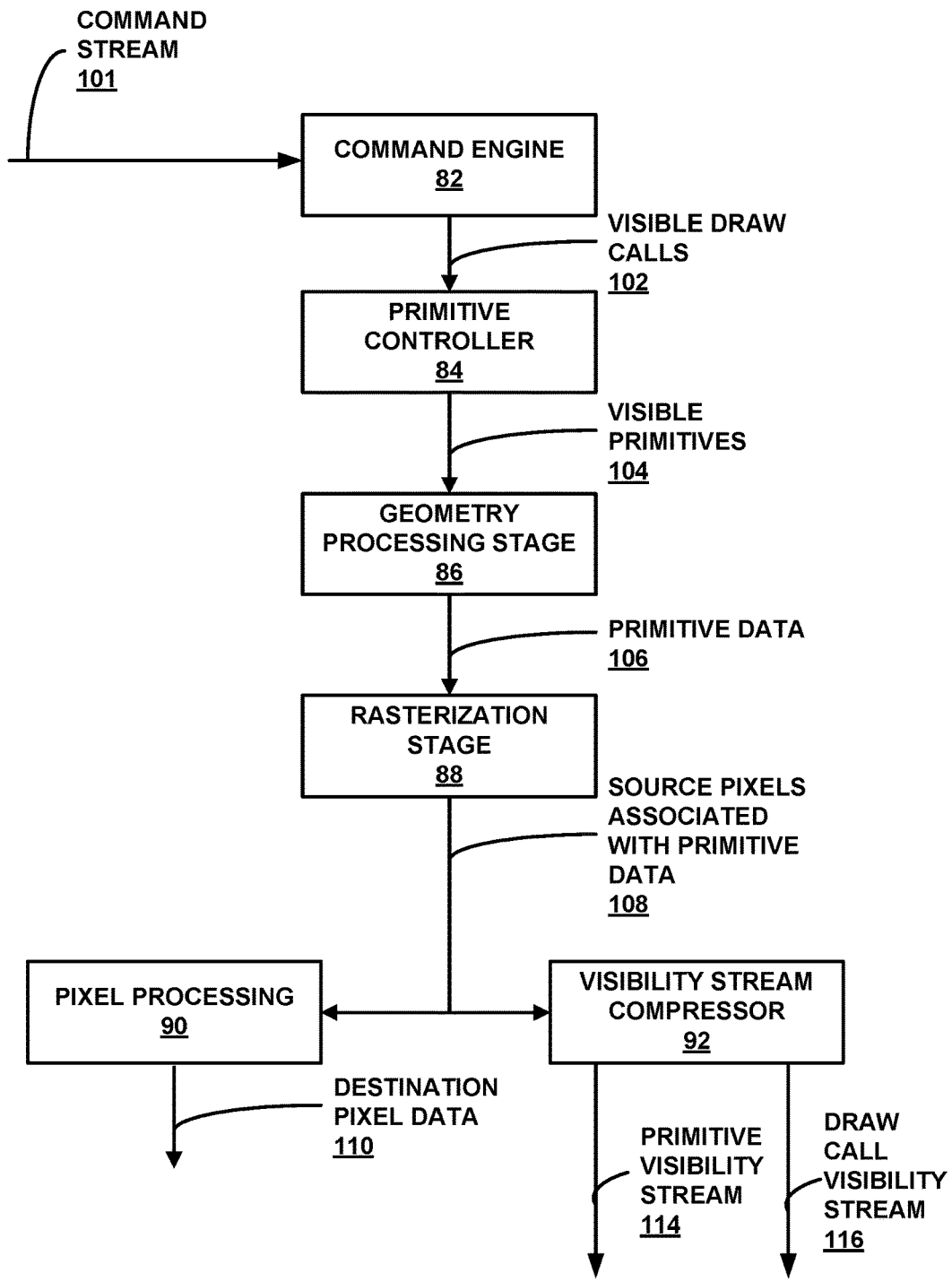
FIG. 3 is a block diagram showing an example process for rendering at least a portion of an image.

FIG. 3 is a block diagram showing an example process for rendering at least a portion of an image. As shown, command engine 82 receives a command stream 101. The command stream 101 may include a set of draw calls output by GPU driver 50 of CPU 32. Command engine 82 determines, based on draw call visibility stream 62, visible draw calls 102 from the command stream 101. That is, command engine 82 identifies draw calls that include instructions for rendering visible primitives that is visible in a final rendering of an image. In the example, command engine 82 outputs visible draw calls 102 and drops draw calls of the set of draw calls that are not visible (e.g., do not indicate any visible primitives).

Stated differently, based on draw call visibility stream 62 indicating that a respective draw call does not include instructions for rendering visible primitives, command engine 82 drops the respective draw call. Based, however, on draw call visibility stream 62 indicating that the respective draw call includes instructions for rendering visible primitives, primitive controller 84 executes the respective draw call. For instance, primitive controller 84 determines, based on primitive visibility stream 60 and visible draw calls 102, visible primitives 104. In this manner, command engine 82 and primitive controller 84 may quickly drop dead draw calls (e.g., draw calls indicating only invisible primitives).

Geometry processing stage 86 processes visible primitives 104 to generate primitive data 106. Rasterization stage 88 generates, based on primitive data 106, source pixels associated with primitive data 108. Pixel processing 90 renders, based on source pixels associated with primitive data 108, destination pixel data 110 for output at display unit 42.

During a binning pass, visibility stream compressor 92 generates, based on source pixels associated with primitive data 108, primitive visibility stream 114 and draw call visibility stream 116. In this manner, visibility stream compressor 92 may generate primitive visibility stream 114 and draw call visibility stream 116 to quickly drop dead draw calls (e.g., draw calls that are invisible) for rendering at least a region of an image.

Figure 4:
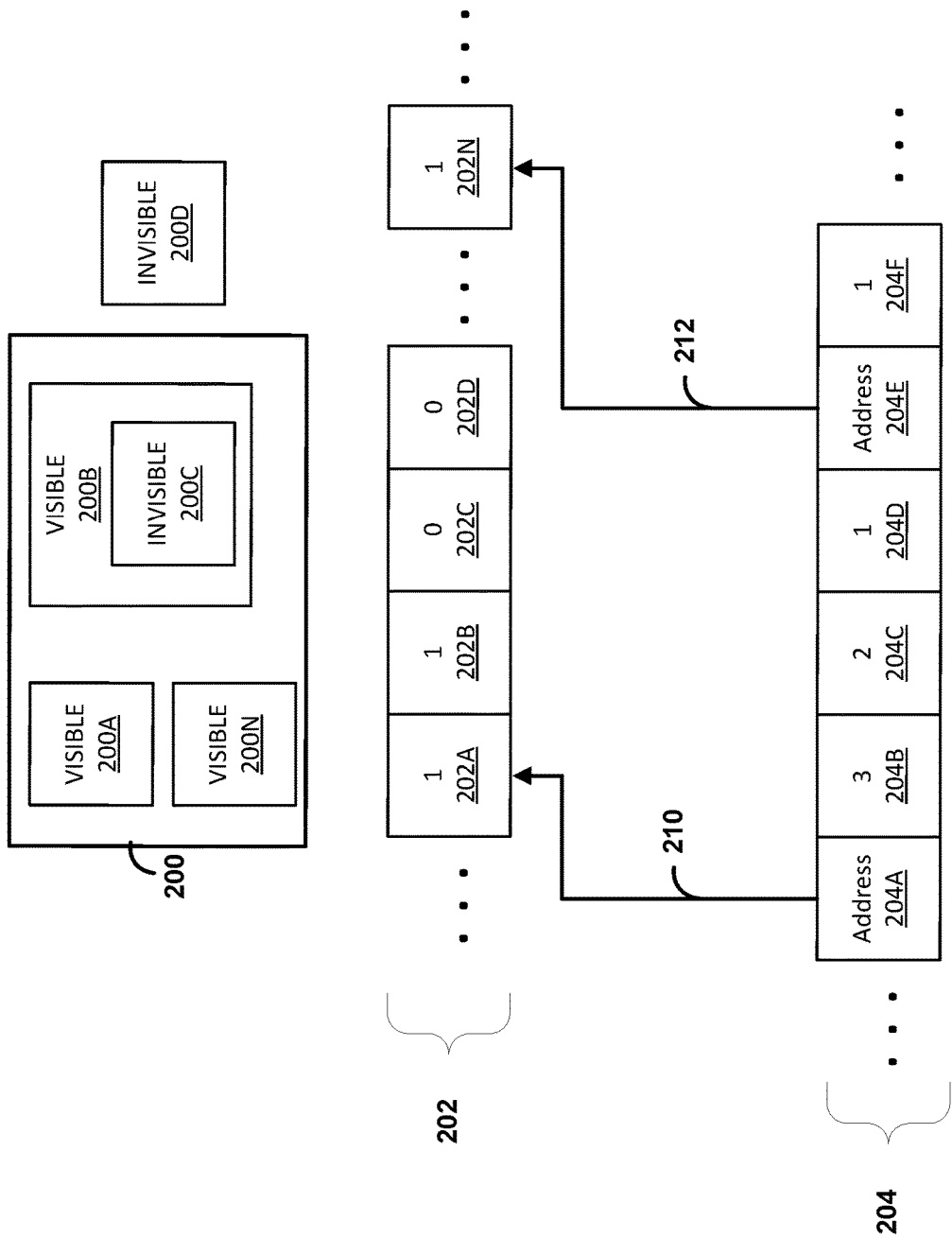
FIG. 4 is a conceptual diagram showing an example of a draw call visibility stream and an example of a primitive visibility stream.

FIG. 4 is a conceptual diagram showing an example of a draw call visibility stream 204 and n example of a primitive visibility stream 202. In the example of FIG. 4, region 200 for an image being rendered may be processed using primitives 200A-200N. However, in the example, primitive 200C is invisible because primitive 200B is opaque and positioned over primitive 200C (e.g., obstructed). Additionally, in the example, primitive 200D is invisible because primitive 200D is outside of region 200 for the image being rendered.

In the example of FIG. 4, primitive visibility stream 202 indicates visibility information 202A that is associated with primitive 200A, visibility information 202B that is associated with primitive 200B, visibility information 202C that is associated with primitive 200C, visibility information 202D that is associated with primitive 200D, . . . , and visibility information 202N that is associated with primitive 200N. Visibility information 202A, B, and N, may indicate that the primitives 200A, B, and N are visible by a logical high bit '1'. In the example, visibility information 202C and D, may indicate that primitives 200C and D are invisible by a logical low bit '0'. In other examples, primitive visibility stream 202 may indicate that primitives associated with visibility information are visible by a logical low bit '0' and may indicate that primitives associated with visibility information are invisible by a logical high bit '1'.

In the example of FIG. 4, draw call visibility stream 204 includes visibility information 204A at an entry corresponding to a first draw call, visibility information 204B at an entry corresponding to a second draw call, visibility information 204C at an entry corresponding to a third draw call, visibility information 204D at an entry corresponding to a fourth draw call, visibility information 204E at an entry corresponding to a fifth draw call, and visibility information 204F at an entry corresponding to a sixth draw call. In the example, visibility information 204A includes a pointer 210 indicating visibility information 202A, which is at an entry corresponding to primitive 200A. Said differently, visibility information 204A includes pointer 210 indicating a portion of primitive visibility stream 202 that corresponds to primitives for the first draw call. Similarly, visibility information 204N includes a pointer 212 indicating visibility information 202N, which is at an entry corresponding to primitive 200N. In this way, command engine 82 and/or primitive controller 84 may be configured to determine, using pointers (e.g., 210 and 212), visibility information in primitive visibility stream 202.

In the example of FIG. 4, draw call visibility stream 204 may include an indication of a number of consecutive draw calls in command stream 101 that do not include instructions for rendering at least one visible primitive. For instance, as shown, visibility information 204B includes an indication of three consecutive draw calls in command stream 101 that do not include instructions for rendering at least one visible primitive, visibility information 204C includes an indication of two consecutive draw calls in command stream 101 that do not include instructions for rendering at least one visible primitive, and visibility information 204D includes an indication of one draw call in command stream 101 that does not include instructions for rendering at least one visible primitive. In this way, command engine 82 and/or primitive controller 84 may be configured to drop, using draw call visibility stream 204, consecutive draw calls in command stream 101 that do not include instructions for rendering at least one visible primitive.

Figure 5:
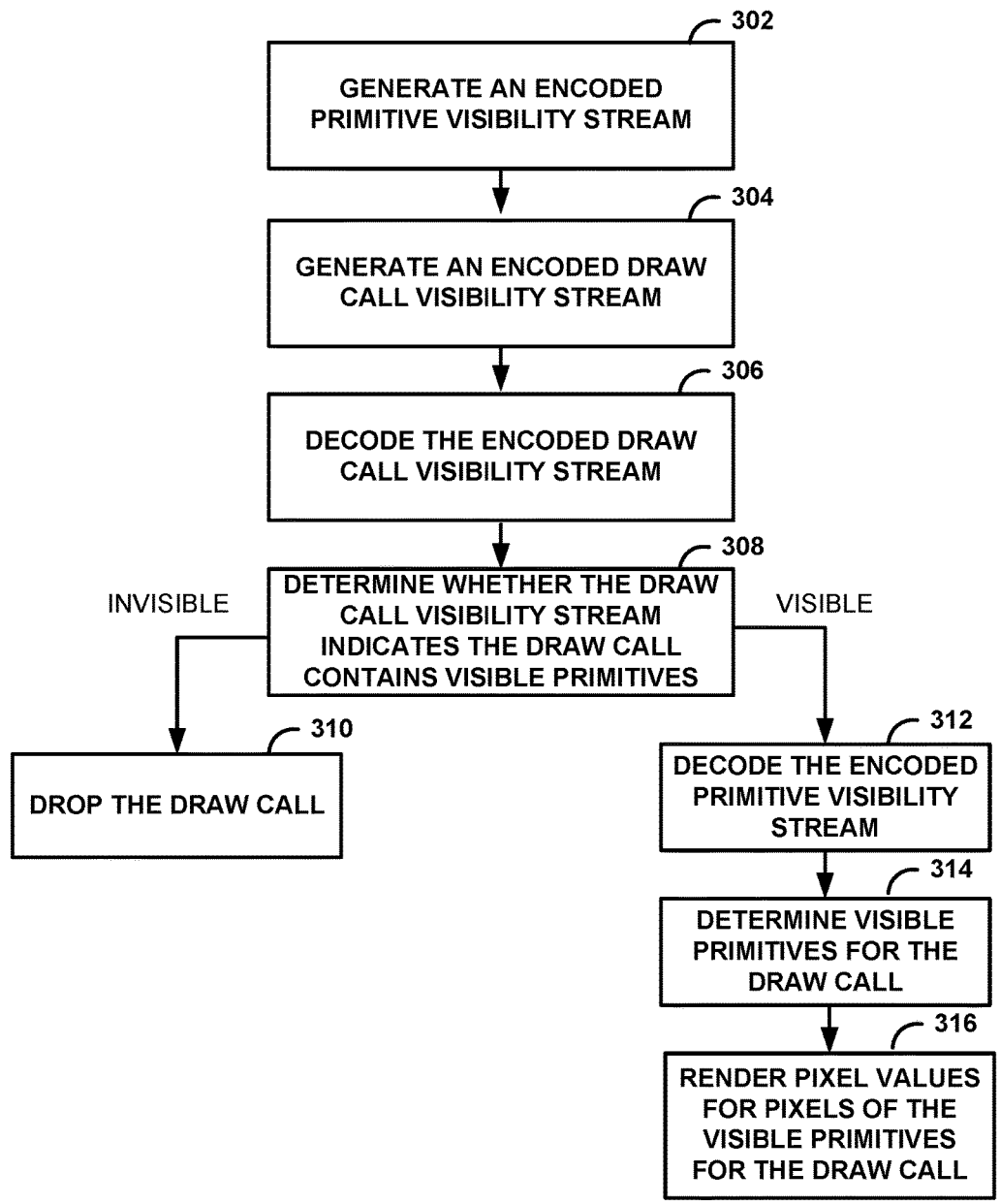
FIG. 5 is a flowchart illustrating an example process for rendering at least a portion of an image, according to techniques of this disclosure.

FIG. 5 is a flowchart illustrating an example process for rendering at least a portion of an image, according to techniques of this disclosure. Visibility stream compressor 92 generates an encoded primitive visibility stream 202 (302). For instance, visibility stream compressor 92 generates, during a binning pass, primitive visibility stream 202 of FIG. 4 and compresses primitive visibility stream 202 for storage at GPU memory 38 of FIG. 2. Visibility stream compressor 92 generates an encoded draw call visibility stream (304). For instance, visibility stream compressor 92 generates, during a binning pass, draw call visibility stream 204 of FIG. 4 and compresses draw call visibility stream 204 for storage at GPU memory 38 of FIG. 2.

Command engine 82 decodes the encoded draw call visibility stream (306). For instance, command engine 82 accesses, during a rendering pass, draw call visibility stream 62 from GPU memory 38 and decompresses draw call visibility stream 62 to access visibility information contained in draw call visibility stream 62. Command engine 82 determines whether draw call visibility stream 62 indicates that a draw call includes instructions for rendering at least one visible primitive (308). For instance, command engine 82 determines that draw call visibility stream 62 indicates the draw call includes instructions for rendering at least one visible primitive when the draw call visibility stream 62 indicates a pointer to primitive visibility stream 60 and determines that draw call visibility stream 62 indicates the draw call does not include instructions for rendering at least one visible primitive when the draw call visibility stream 62 indicates a number of consecutive draw calls in command stream 101 that do not include instructions for rendering at least one visible primitive. In response to determining that the draw call visibility stream indicates that the draw call does not include instructions for rendering at least one primitive of the set of primitives that is visible when rendered ("invisible" of 308), command engine 82 drops the draw call (310). For instance, primitive controller 84 refrains from executing the draw call to render one or more primitives for the draw call. In some instances, primitive controller 84 refrains from processing a portion of the primitive visibility stream that corresponds to the one or more primitives for the draw call. For instance, primitive controller 84 may refrain from accessing primitive visibility stream 60 from GPU memory 38 and refrain from decompressing primitive visibility stream 60 to access visibility information contained in primitive visibility stream 60.

In response, however, to determining that the draw call visibility stream indicates that the draw call includes instructions for rendering at least one primitive of the set of primitives that is visible when rendered ("visible" of 308), primitive controller 84 decodes the encoded primitive visibility stream (312). For instance, primitive controller 84 accesses primitive visibility stream 60 from GPU memory 38 and decompresses primitive visibility stream 60 to access visibility information contained in primitive visibility stream 60. Primitive controller 84 determines visible primitives for the draw call (314). For instance, primitive controller 84, using a pointer 210 of FIG. 4, determines visibility information 202A of primitive visibility stream 202 indicates that primitive 200A is visible. Pixel processing 90 renders pixel values for pixels of the one or more visible primitives for the draw call (316). For instance, pixel processing 90 processes primitive data for the visible primitives to render a second image for output at display unit 42.

Figure 6:
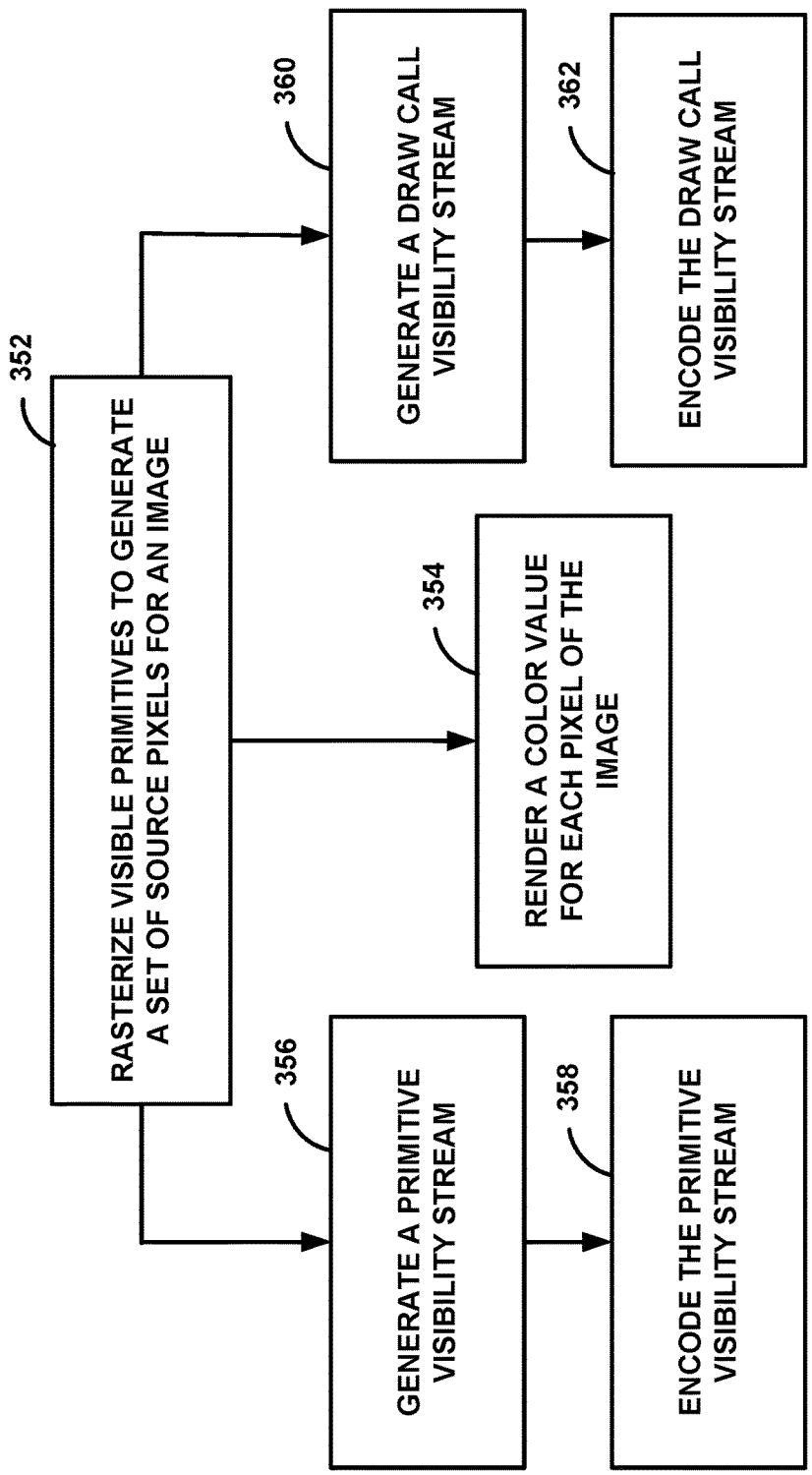
FIG. 6 is a flowchart illustrating another example process for rendering at least a portion of an image, according to the techniques of this disclosure.

FIG. 6 is a flowchart illustrating another example process for rendering at least a portion of an image, according to the techniques of this disclosure. In the example of FIG. 6, rasterization stage 88 rasterizes visible primitives to generate a set of source pixels for an image (352). Visibility stream compressor 92 generates a primitive visibility stream (356) and encodes the primitive visibility stream (358). For instance, visibility stream compressor 92 compresses primitive visibility stream 202 of FIG. 4 for storage at GPU memory 38 of FIG. 2. Visibility stream compressor 92 generates a draw call visibility stream (360) and encodes the draw call visibility stream (362). For instance, visibility stream compressor 92 compresses draw call visibility stream 204 of FIG. 4 for storage at GPU memory 38 of FIG. 2. As shown, and in some examples during a rendering pass, pixel processing 90 renders a color value for each pixel of the image (354). For instance, pixel processing 90 generates, based on the set of source pixels for an image, rendered data 45 of FIG. 1 for storage at display buffer unit 44 of FIG. 1.

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   generating a primitive visibility stream that indicates whether respective primitives of a set of primitives are visible when rendered;
   generating, based on the primitive visibility stream, a draw call visibility stream that indicates whether respective draw calls for rendering the set of primitives include instructions for rendering visible primitives of the set of primitives;
   based on the draw call visibility stream indicating that a respective draw call does not include instructions for rendering visible primitives, dropping a portion of the primitive visibility stream that corresponds to the respective draw call; and
   based on the draw call visibility stream indicating that the respective draw call includes instructions for rendering visible primitives, executing the respective draw call.

2. The method of claim 1, wherein executing the respective draw call comprises:
   determining, based on the primitive visibility stream, one or more visible primitives for the respective draw call.

3. The method of claim 2, wherein executing the respective draw call comprises determining pixel values for pixels of the one or more visible primitives for the respective draw call.

4. The method of claim 1, wherein generating the primitive visibility stream comprises determining one or more obstructed primitives of the set of primitives that are obstructed by another primitive of the set of primitives and indicating that the one or more obstructed primitives are not visible in the visibility stream.

5. The method of claim 1, wherein the set of primitives correspond to a region of an image, such that the primitive visibility stream and the draw call visibility stream correspond to the region of the image.

6. The method of claim 1, wherein:
   generating the primitive visibility stream comprises generating the primitive visibility stream as an encoded primitive visibility stream; and
   dropping the portion of the primitive visibility stream that corresponds to the respective draw call comprises refraining from decoding a portion of the encoded primitive visibility stream that corresponds to the respective draw call.

7. The method of claim 6, wherein executing the respective draw call comprises decoding the portion of the encoded primitive visibility stream that corresponds to the respective draw call.

8. The method of claim 1, wherein generating the draw call visibility stream comprises:
   responsive to determining that the respective draw call includes instructions for rendering visible primitives, generating, at an entry of the draw call visibility stream that corresponds to the respective draw call, a pointer indicating a second portion of the primitive visibility stream.

9. The method of claim 1, wherein generating the draw call visibility stream comprises:
   responsive to determining that the respective draw call does not include instructions for rendering visible primitives, generating, at an entry of the draw call visibility stream that corresponds to the respective draw call, an indication of a number of consecutive draw calls of the set of draw calls that do not include instructions for rendering visible primitives.

10. A device comprising one or more processors configured to:
    generate a primitive visibility stream that indicates whether respective primitives of a set of primitives are visible when rendered;
    generate, based on the primitive visibility stream, a draw call visibility stream that indicates whether respective draw calls for rendering the set of primitives include instructions for rendering visible primitives of the set of primitives;
    based on the draw call visibility stream indicating that a respective draw call does not include instructions for rendering visible primitives, drop a portion of the primitive visibility stream that corresponds to the respective draw call; and
    based on the draw call visibility stream indicating that the respective draw call includes instructions for rendering visible primitives, execute the respective draw call.

11. The device of claim 10, wherein to execute the respective draw call, the one or more processors are configured to:
    determine, based on the primitive visibility stream, one or more visible primitives for the respective draw call.

12. The device of claim 11, wherein to execute the respective draw call, the one or more processors are configured to:
    determine pixel values for pixels of the one or more visible primitives for the respective draw call.

13. The device of claim 10, wherein to generate the primitive visibility stream, the one or more processors are configured to:
    determine one or more obstructed primitives of the set of primitives that are obstructed by another primitive of the set of primitives; and
    indicate that the one or more obstructed primitives are not visible in the visibility stream.

14. The device of claim 10, wherein the set of primitives correspond to a region of an image, such that the primitive visibility stream and the draw call visibility stream correspond to the region of the image.

15. The device of claim 10, wherein:
    to generate the primitive visibility stream, the one or more processors are configured to generate the primitive visibility stream as an encoded primitive visibility stream; and
    to drop the portion of the primitive visibility stream that corresponds to the respective draw call, the one or more processors are configured to refrain from decoding a portion of the encoded primitive visibility stream that corresponds to the respective draw call.

16. The device of claim 15, wherein to execute the respective draw call, the one or more processors are configured to:
    decode the portion of the encoded primitive visibility stream that corresponds to the respective draw call.

17. The device of claim 10, wherein to generate the draw call visibility stream, the one or more processors are configured to:
    responsive to determining that the respective draw call includes instructions for rendering visible primitives, generate, at an entry of the draw call visibility stream that corresponds to the respective draw call, a pointer indicating a second portion of the primitive visibility stream.

18. The device of claim 10, wherein to generate the draw call visibility stream, the one or more processors are configured to:

responsive to determining that the respective draw call does not include instructions for rendering visible primitives, generate, at an entry of the draw call visibility stream that corresponds to the respective draw call, an indication of a number of consecutive draw calls of the set of draw calls that do not include instructions for rendering visible primitives.

19. A non-transitory computer-readable medium having instructions stored thereon that, when executed, cause one or more processors to:
generate a primitive visibility stream that indicates whether respective primitives of a set of primitives are visible when rendered;
generate, based on the primitive visibility stream, a draw call visibility stream that indicates whether respective draw calls for rendering the set of primitives include instructions for rendering visible primitives of the set of primitives;
based on the draw call visibility stream indicating that a respective draw call does not include instructions for rendering visible primitives, drop a portion of the primitive visibility stream that corresponds to the respective draw call; and
based on the draw call visibility stream indicating that the respective draw call includes instructions for rendering visible primitives, execute the respective draw call.

20. The non-transitory computer-readable medium of claim 19, wherein to execute the respective draw call, the one or more processors are further caused to:
determine, based on the primitive visibility stream, one or more visible primitives for the respective draw call.

21. The non-transitory computer-readable medium of claim 20, wherein to execute the respective draw call, the one or more processors are further caused to:
determine pixel values for pixels of the one or more visible primitives for the respective draw call.

22. The non-transitory computer-readable medium of claim 19, wherein to generate the primitive visibility stream, the one or more processors are further caused to:
determine one or more obstructed primitives of the set of primitives that are obstructed by another primitive of the set of primitives; and
indicate that the one or more obstructed primitives are not visible in the visibility stream.

23. The non-transitory computer-readable medium of claim 19, wherein the set of primitives correspond to a region of an image, such that the primitive visibility stream and the draw call visibility stream correspond to the region of the image.

24. The non-transitory computer-readable medium of claim 19, wherein:
to generate the primitive visibility stream, the one or more processors are further caused to generate the primitive visibility stream as an encoded primitive visibility stream; and
to drop the portion of the primitive visibility stream that corresponds to the respective draw call, the one or more processors are further caused to refrain from decoding a portion of the encoded primitive visibility stream that corresponds to the respective draw call.

25. The non-transitory computer-readable medium of claim 24, wherein to execute the respective draw call, the one or more processors are further caused to:
decode the portion of the encoded primitive visibility stream that corresponds to the respective draw call.

26. The non-transitory computer-readable medium of claim 19, wherein to generate the draw call visibility stream, the one or more processors are further caused to:
responsive to determining that the respective draw call includes instructions for rendering visible primitives, generate, at an entry of the draw call visibility stream that corresponds to the respective draw call, a pointer indicating a second portion of the primitive visibility stream.

27. A device comprising:
means for generating a primitive visibility stream that indicates whether respective primitives of a set of primitives are visible when rendered;
means for generating, based on the primitive visibility stream, a draw call visibility stream that indicates whether respective draw calls for rendering the set of primitives include instructions for rendering visible primitives of the set of primitives;
means for dropping a portion of the primitive visibility stream that corresponds to the respective draw call based on the draw call visibility stream indicating that a respective draw call does not include instructions for rendering visible primitives; and
means for executing the respective draw call based on the draw call visibility stream indicating that the respective draw call includes instructions for rendering visible primitives.

* * * * *